Sept. 22, 1942.　　　W. R. GRISWOLD　　　2,296,520
MOTOR VEHICLE
Filed Dec. 6, 1940
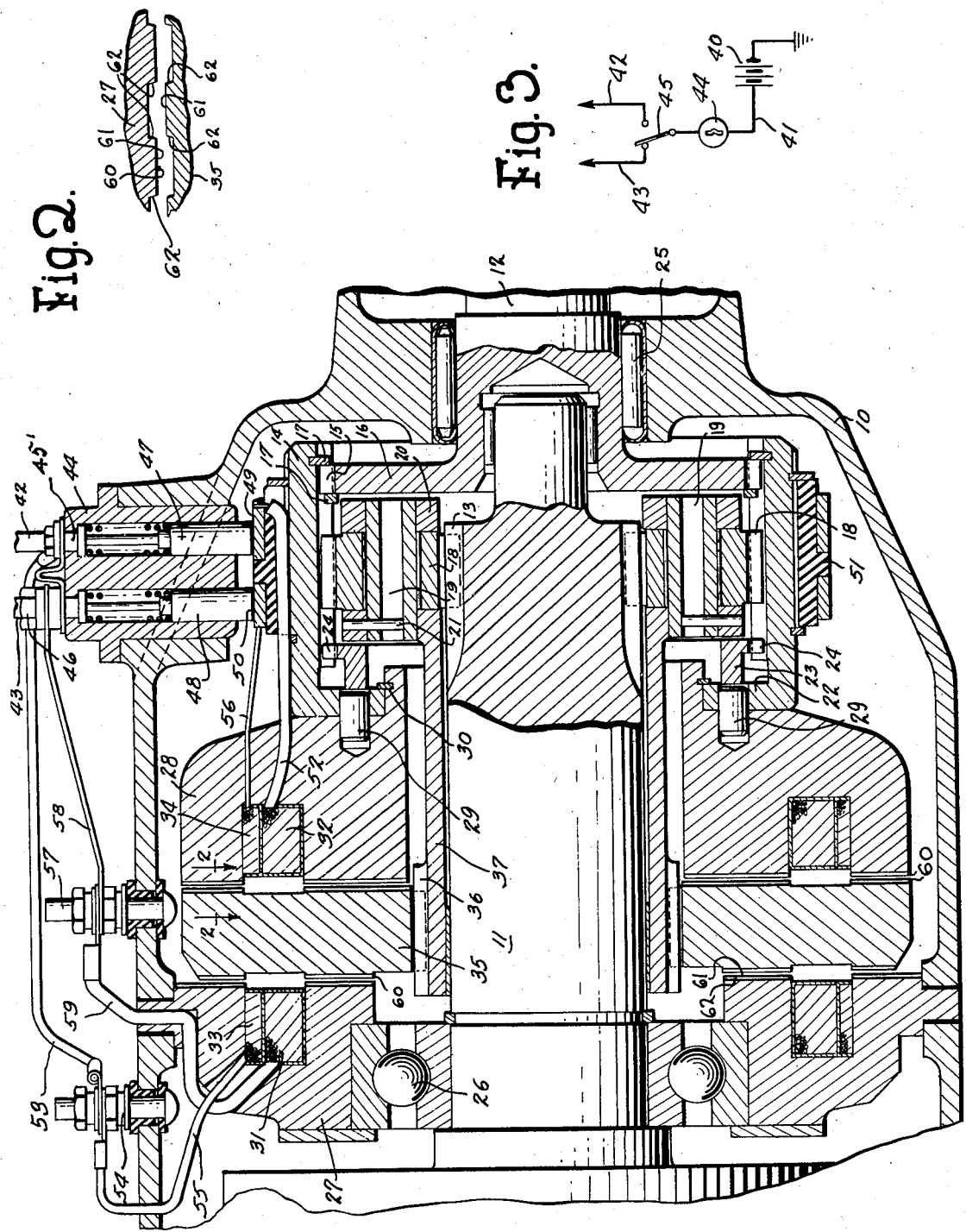
INVENTOR.
Walter R. Griswold
BY
Tibbetts & Hart
Attys.

Patented Sept. 22, 1942

2,296,520

UNITED STATES PATENT OFFICE 2,296,520

MOTOR VEHICLE

Walter R. Griswold, Detroit, Mich., assignor to Packard Motor Car Company, Detroit, Mich., a corporation of Michigan Application December 6, 1940, Serial No. 368,813

5 Claims. (Cl. 74—298)

This invention relates to drive mechanism, and more particularly to drive mechanism in which planetary gearing is controlled to establish forward or reverse drive.

In such mechanism planetary gearing is arranged between a power shaft and a tail shaft, and mechanism is provided for controlling the drive through the gearing. When the drive is of a fluid torque converter type, a large capacity control mechanism is required and where size and weight are factors, such as they are in motor vehicles, a positive engaging device is desirable. Because of torque reaction on a positively engaging control device, considerable difficulty has been encountered in shifting from one driving relation to another when the power is not disconnected.

It is an object of this invention to provide a relatively small, high capacity positive control device for planetary gearing, in drive mechanism of the character referred to, that can be readily and quickly shifted to change the drive.

Another object of the invention is to provide a positive engagement drive selecting device in which a control member can be shifted magnetically without appreciable delay.

A further object of the invention is to provide a compact continuously engaged drive mechanism with a positive type control member that can be readily shifted between forward and reverse positions.

Other objects of the invention will appear from the following description taken in connection with the drawing, which forms a part of this specification, and in which:

Fig. 1 is a vertical sectional view through a portion of a drive mechanism having the invention incorporated therewith;

Fig. 2 is a sectional view taken on line 2—2 of Fig. 1, showing the positive control connections;

Fig. 3 is a diagrammatic view of the electrical connections for the magnet.

Referring now to the drawing by characters of reference, 10 indicates the casing for drive mechanism in which a power driven shaft 11 and a tail shaft 12 are mounted in aligned relation. The shaft 11 can be driven by suitable mechanism, such as a fluid torque converter, and the drive mechanism is adapted particularly for motor driven vehicles. The two shafts are drivingly connected by planetary gearing and the sun gear consists of teeth 13 formed directly on the drive shaft. A ring gear 14 has internal teeth with which the teeth 15 on the flanged end 16 of the tail shaft engage, and axial displacement of the tail shaft relative to the ring gear is prevented by snap rings 17 arranged on each side of the teeth 15 in recesses in the ring gear. Planet gears 18 mesh with the ring gear and the sun gear and are rotatably mounted upon shafts 19 fixed to a carrier 20 by pins 21.

The ring gear is formed with an inwardly extending flange 22 at one end and a spacer ring 23 is arranged between such flange and the adjacent portion of the carrier, thus limiting axial movement of the carrier between the ring gear flange 22 and the tail shaft flange 16. This spacer ring 23 is formed with teeth 24 that engage with the internal teeth of the ring gear. One of the bearings for the tail shaft is indicated at 25 and one of the bearings for the drive shaft is indicated at 26.

By holding the planet gear carrier 20 stationary there will be a reverse drive through the planetary gearing from shaft 11 to shaft 12 and by locking the ring gear with the planet gear carrier there will be a direct forward drive through the planetary gearing between shafts 11 and 12. This control of the planetary gearing to provide either a forward or a reverse drive is accomplished by means of a pair of electromagnetic devices. One of the devices includes a ring core 27 that is suitably fixed to the casing 10 and the other device includes a ring core 28 that lies adjacent the flange 22 of the ring gear and is connected to rotate therewith by means of dowel pins 29. A snap ring 30 seats in a recess in the core to prevent axial displacement of the flanged portion of the ring gear relative to the core. In the core 27 is a main winding coil 31 and there is a similar main winding coil 32 in the core 28. There is also an auxiliary winding coil 33 in the ring core 27 and there is a similar auxiliary winding coil 34 in the ring core 28. A ring armature 35 is arranged between the cores and is formed with internal splines that are slidably engaged with splines 36 on a sleeve 37 which is an extension of the planet gear carrier rotatably mounted upon the drive shaft.

The arrangement is such that current will flow through the auxiliary coils to set up a flux circuit flowing oppositely from that set up by the adjacent main winding coils and the auxiliary winding coils are connected to the same circuit as the main winding coils in the opposite core. Thus the auxiliary winding coils will be energized one at a time in a relation such that they are effective in the core where the main winding coil has just become ineffective so that the flux flow of the auxiliary winding coil will oppose that of the main winding coil and serves to break the same down when the opposite core has been energized. The tendency of the remaining magnetic flux in the deenergized coil to hold the armature will, in this manner, be broken down more quickly.

The motor vehicle battery is indicated at 40 and an electrical conductor line 41 leads therefrom to a pair of conductor lines 42 and 43. In the line 41 is the usual ignition switch 44, and at the junction of the line 41 with the lines 42 and 43 is a manually operable switch 45 by means of which such lines can be selectively connected with or disconnected from line 41. The casing is formed with an opening in which a connector housing 44 is fitted and this housing carries terminals 45' and 46. Spring pressed plunger type brush members 47 and 48 are arranged in the housing and they respectively bear against contact rings 49 and 50. These rings are spaced and fixed to an insulation ring 51 that is suitably secured on the periphery of the planetary gearing ring gear. Contact ring 49 is connected with main coil 32 by line 52 and the auxiliary coil 33 is connected with the terminal 45', line 53, terminal post 54 and line 55. The contact ring 50 is connected with auxiliary coil 34 by contact line 56 and the terminal 46 is connected with a terminal post 57 by a line 58, and from the terminal post 57 extends a conductor line 59 that is connected with the winding coil 31.

Whenever the line 42 is connected with the battery by switch 45, main coil 32 and auxiliary coil 33 will be energized and when line 43 is connected with the battery by switch 45, main coil 31 and auxiliary coil 34 will be energized. Thus the armature 35 will be shifted axially toward the core in which the main coil is energized by means of the magnetic flux that is set up, and this movement will be expedited by the reverse flux flow in the core that has just been deenergized due to the breaking down of the remaining flux flow. Thus there will be no appreciable delay in shifting the armature to establish forward or reverse drive.

In order that the drive mechanism can have a relatively small diameter and at the same time have a large capacity, the armature and the cores are arranged to engage positively and their adjacent faces are formed with radially extending complementary teeth 60. The outer faces 61 of the teeth are flat and the side faces 62 of the teeth are formed to extend at an angle slightly more than a right angle to such outer faces. With this type of tooth form, driving torque tends to disengage the teeth so that the armature can be readily shifted by the magnet cores.

This form of control mechanism is compact and has relatively large capacity. The shift between forward and reverse drives can be readily made without appreciable delay.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Drive mechanism comprising a casing, a power shaft in the casing, a tail shaft in the casing, planetary gearing drivingly connecting said shafts, said gearing including a planet gear carrier sleeve rotatably mounted on the power shaft and a ring gear fixed to the tail shaft, an electromagnet fixed to the casing, an electromagnet fixed to the ring gear, said magnets being spaced and having teeth on their adjacent faces, an armature ring slidably splined on said sleeve between said electromagnets and having teeth on its faces for engaging the teeth of said electromagnets, and means selectively controlling said electromagnets.

2. Drive mechanism comprising a casing, planetary gearing including a planet gear carrier sleeve and a ring gear in the casing, a power shaft having the planetary gearing sun gear fixed thereto, a tail shaft fixed to rotate with the ring gear, a magnet core fixed to the ring gear, a magnet core fixed to the casing in spaced relation with the ring gear core, an armature between the cores and slidably splined on the carrier sleeve, main windings in the cores, auxiliary windings in the cores through which current will flow in directions opposite to current in the adjacent main windings, means for selectively supplying current to the main windings, and conductors connecting the auxiliary windings with the main windings of the opposite magnets.

3. Drive mechanism comprising a casing, a power shaft mounted in the casing, a flanged tail shaft mounted in the casing in alignment with the power shaft, a sun gear fixed on the power shaft, a flanged ring gear surrounding the sun gear and having the flanged portion fixed to rotate with the tail shaft, planet gears meshing with the sun and ring gears, a carrier for the planet gears between the flanged portions of the tail shaft and the ring gear, said carrier having a sleeve extension rotatably mounted on the drive shaft, a spacer ring between the carrier and the flange of the ring gear, said spacer ring being splined to the ring gear, and shiftable means operable to hold the sleeve extension stationary or fixed to rotate with the ring gear.

4. Drive mechanism comprising a casing, a power shaft in the casing, a tail shaft in the casing, planetary gearing drivingly connecting said shafts, said gearing including a planet gear carrier sleeve rotatably mounted on the power shaft and a ring gear, a magnet ring fixed to the casing, a magnet ring fixed to the ring gear, an armature ring slidably splined on the carrier sleeve between said magnet rings, the adjacent faces of said magnets and armature having engageable teeth with sides extending at more than a right angle to the outer face, and means for selectively energizing said magnet rings.

5. Drive mechanism comprising a power shaft, a tail shaft, planetary gearing drivingly connecting said shafts including a flanged ring gear fixed to rotate with the tail shaft and a planet gear carrier sleeve rotatably mounted on the power shaft, a magnet ring core adjacent the flanged portion of the ring gear, dowel pins in the ring flange and the core, a snap ring in the core locking the ring flange from axial displacement from the core, an armature slidably splined to the carrier sleeve adjacent the core, and a winding in the core.

WALTER R. GRISWOLD.